United States Patent
Chen et al.

(10) Patent No.: US 9,993,077 B2
(45) Date of Patent: Jun. 12, 2018

(54) SLIDE RAIL ASSEMBLY AND SLIDING AUXILIARY DEVICE THEREOF

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Hsiu-Chiang Liang, Kaohsiung (TW); Ci-Bin Huang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 48 days.

(21) Appl. No.: 15/162,629

(22) Filed: May 24, 2016

(65) Prior Publication Data
US 2017/0135482 A1 May 18, 2017

(30) Foreign Application Priority Data
Nov. 12, 2015 (TW) .............................. 104137451 A

(51) Int. Cl.
A47B 88/493 (2017.01)
F16C 29/04 (2006.01)
F16C 29/00 (2006.01)

(52) U.S. Cl.
CPC .......... *A47B 88/493* (2017.01); *F16C 29/005* (2013.01); *F16C 29/045* (2013.01);
(Continued)

(58) Field of Classification Search
CPC ............ A47B 88/10; A47B 2210/0037; A47B 2210/0056; A47B 2210/0067; A47B 2210/0075; A47B 88/493; A47B 2210/007; A47B 2210/0013; A47B 2210/0059; A47B 88/487; A47B 2210/0035; A47B 2210/0034; A47B 2210/0032; A47B 88/483; A47B 2210/0048;
(Continued)

(56) References Cited

U.S. PATENT DOCUMENTS 4,037,885 A * 7/1977 Rock ..................... A47B 88/493
                                                      384/19
4,351,575 A * 9/1982 Rock .................... A47B 88/493
                                                    312/334.12
(Continued)

FOREIGN PATENT DOCUMENTS

EP         1516563 A1 *  3/2005   ............ F16C 33/306

OTHER PUBLICATIONS

Machine english translation of EP1516563.*

*Primary Examiner* — Hiwot E Tefera
(74) *Attorney, Agent, or Firm* — Winston Hsu

(57) ABSTRACT

A slide rail assembly includes a first rail, a second rail and a sliding auxiliary device. The second rail is longitudinally movable relative to the first rail. The sliding auxiliary device is movably arranged between the first rail and the second rail. The sliding auxiliary device includes a first part and a second part mutually engaged. At least one rolling member is mounted to one of the first part and the second part for facilitating the second rail to move relative to the first rail.

6 Claims, 8 Drawing Sheets

(52) U.S. Cl.
CPC ............ *A47B 2210/0037* (2013.01); *A47B 2210/0056* (2013.01); *A47B 2210/0067* (2013.01); *A47B 2210/0075* (2013.01)

(58) Field of Classification Search
CPC .... A47B 2210/0081; A47B 2210/0097; A47B 2210/004; A47B 2210/0043; A47B 2210/0064; A47B 2210/0078; A47B 88/44; A47B 88/0466; A47B 2210/0072; A47B 2210/0094; F16C 29/005; F16C 29/045; F16C 33/306; F16C 33/46; F16C 29/04; F16C 29/046; F16C 33/38; F16C 2314/72
USPC ....... 384/18–22, 51, 47, 48, 49; 312/334.12, 312/334.6, 334.8, 334.15, 334.7, 334.9, 312/334.11, 334.13, 334.17, 334.18, 312/334.33, 334.16, 334.25, 334.26, 312/334.32, 334.38
See application file for complete search history.

(56) References Cited

U.S. PATENT DOCUMENTS

| | | | | |
|---|---|---|---|---|
| 4,988,214 A * | 1/1991 | Clement | ............ | A47B 88/493 312/333 |
| 7,156,478 B2 * | 1/2007 | Harn | ............ | A47B 88/493 312/334.15 |
| 7,748,801 B2 | 7/2010 | Prenter | | |
| 7,866,772 B1 * | 1/2011 | Chen | ............ | A47B 88/493 312/334.13 |
| 7,883,162 B2 * | 2/2011 | Langguth | ............ | A47B 88/463 312/319.5 |
| 8,152,252 B2 | 4/2012 | Liang | | |
| 8,167,388 B2 * | 5/2012 | Hammerle | ............ | A47B 88/487 312/334.13 |
| 8,430,567 B2 * | 4/2013 | Lobbezoo | ............ | A47B 88/493 312/334.12 |
| 8,444,236 B2 | 5/2013 | Netzer | | |
| 9,681,748 B2 * | 6/2017 | Chen | ............ | A47B 88/453 |
| 9,784,314 B2 * | 10/2017 | Ng | ............ | F16C 33/46 |
| 2004/0000851 A1 * | 1/2004 | Lam Harn | ............ | A47B 88/493 312/334.7 |
| 2004/0145284 A1 * | 7/2004 | Egger | ............ | E05F 5/02 312/331 |
| 2007/0080616 A1 * | 4/2007 | Lam | ............ | A47B 88/49 312/334.6 |
| 2007/0080617 A1 * | 4/2007 | Lam | ............ | A47B 88/493 312/334.15 |
| 2008/0303395 A1 * | 12/2008 | Chen | ............ | A47B 88/493 312/334.8 |
| 2009/0238503 A1 * | 9/2009 | Liang | ............ | A47B 88/493 384/18 |
| 2013/0002115 A1 * | 1/2013 | Friesenecker | ............ | A47B 88/493 312/334.8 |
| 2013/0127319 A1 * | 5/2013 | Breisacher | ............ | A47B 88/437 312/334.23 |
| 2014/0009054 A1 * | 1/2014 | Salice | ............ | A47B 88/16 312/334.44 |
| 2014/0241651 A1 * | 8/2014 | Greussing | ............ | A47B 88/10 384/19 |
| 2016/0324318 A1 * | 11/2016 | Langguth | ............ | A47B 88/10 |

* cited by examiner

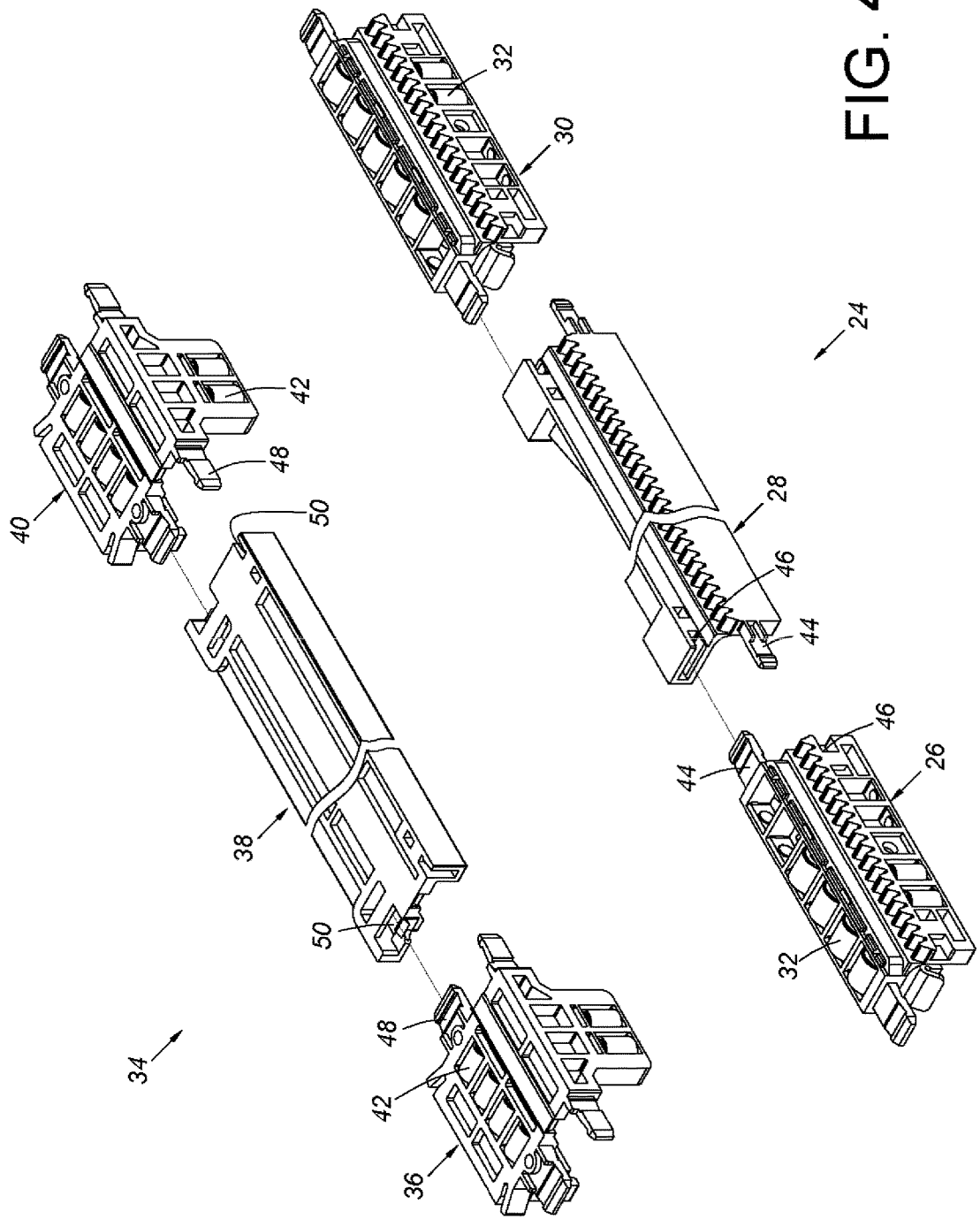

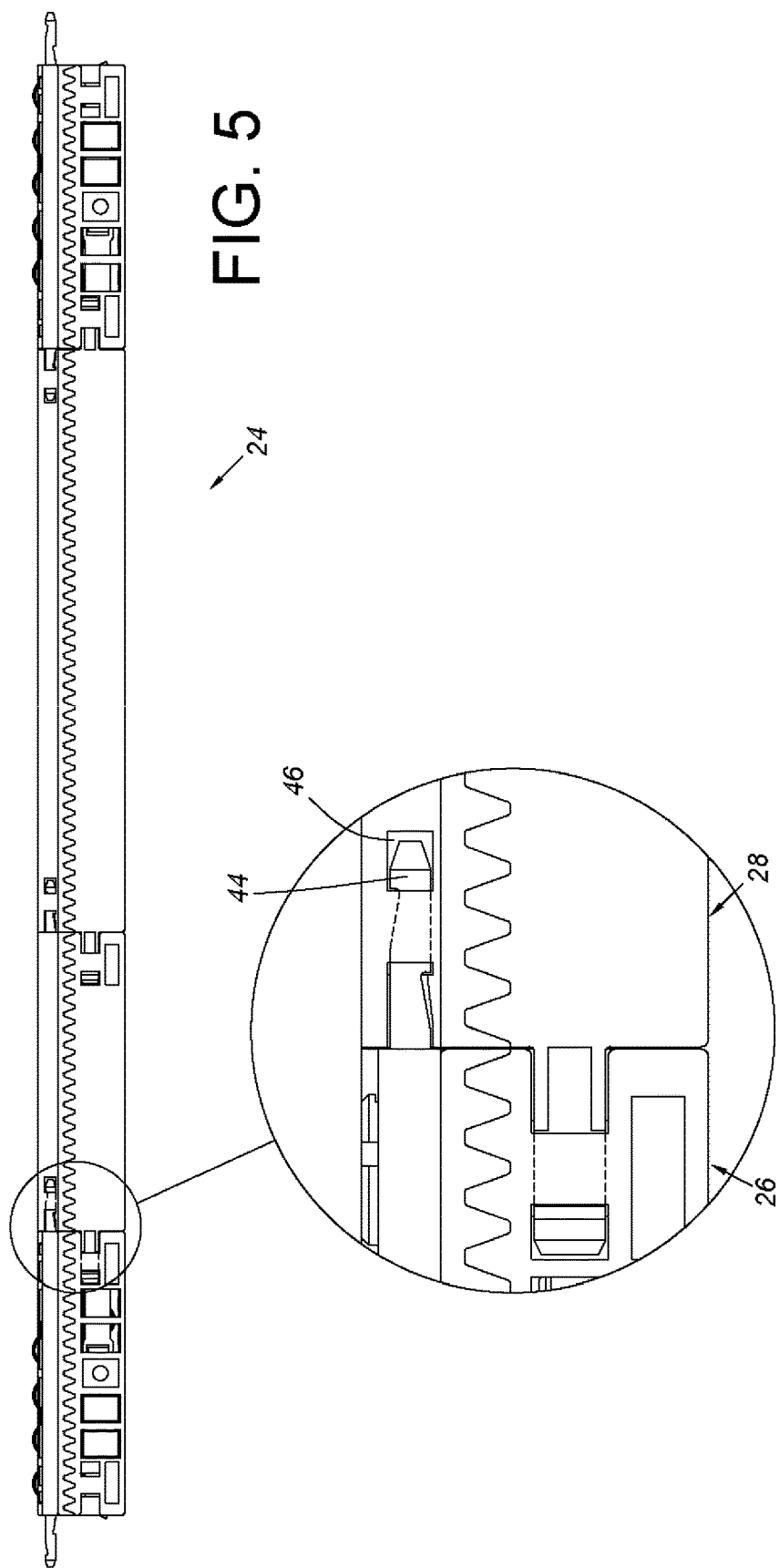

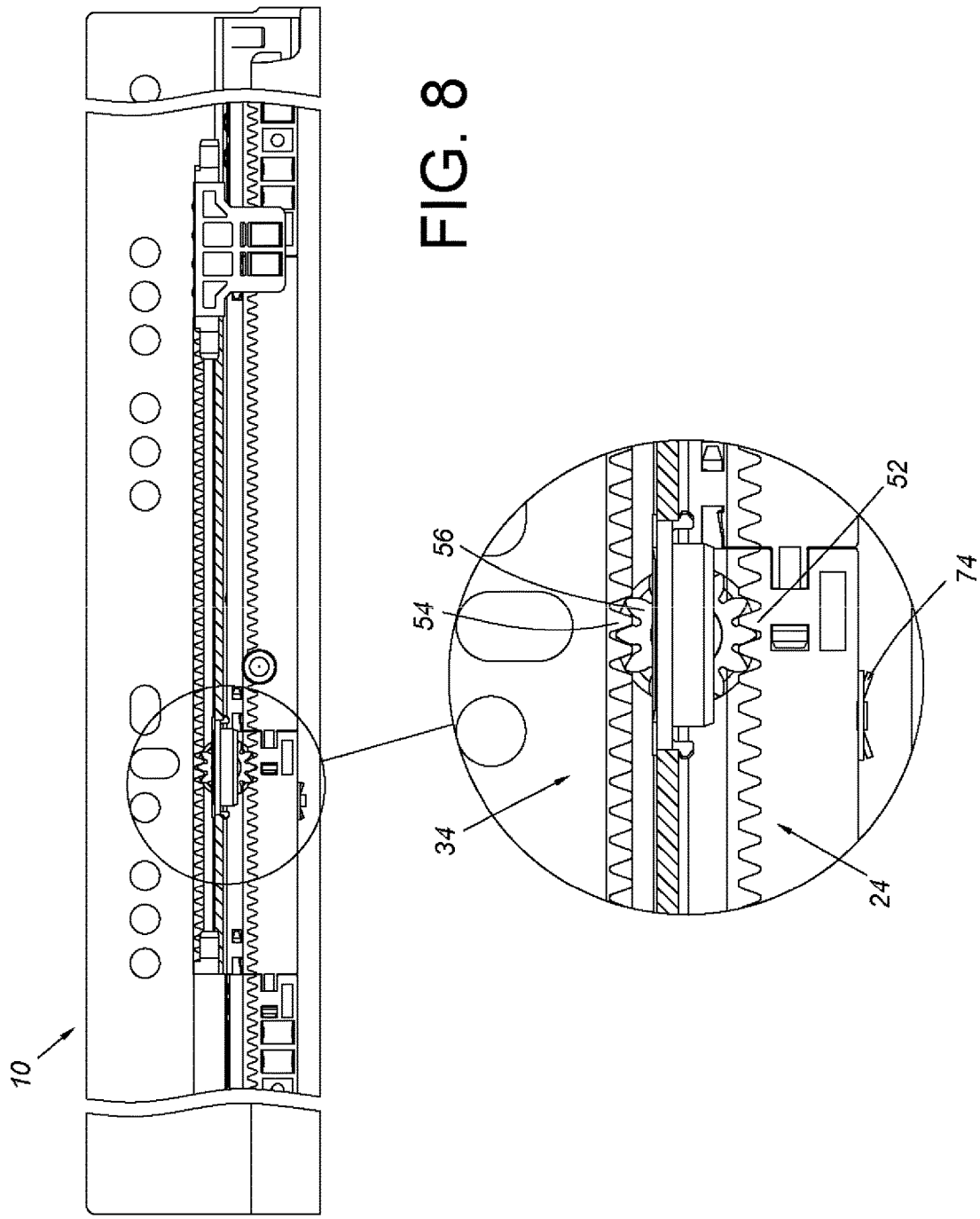

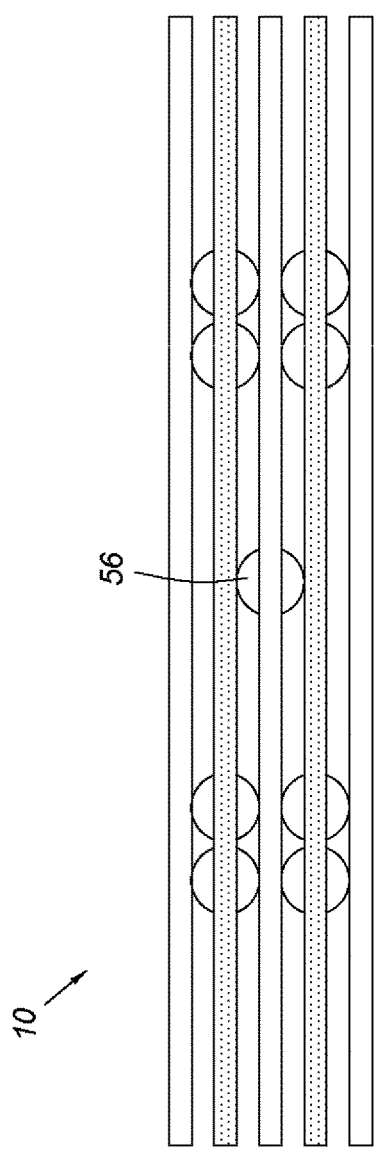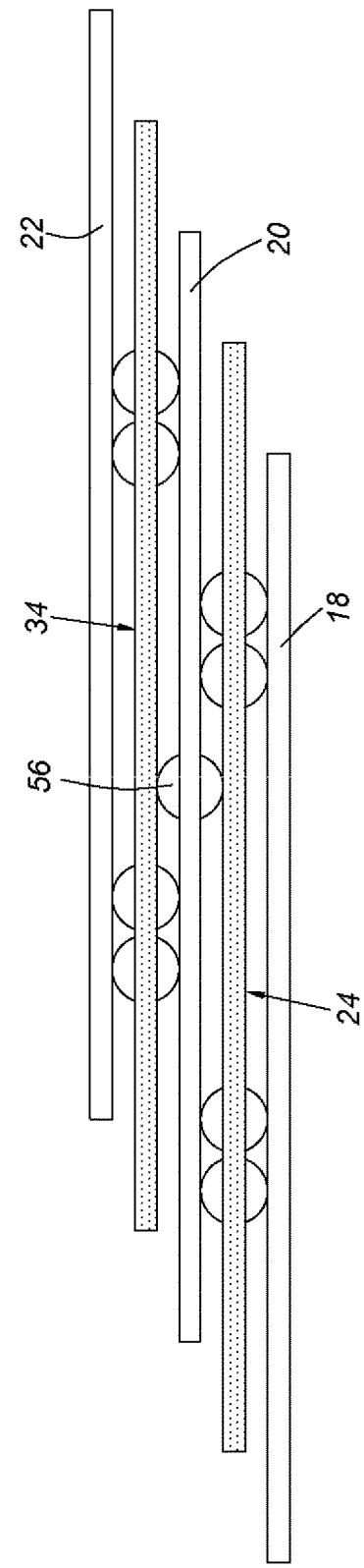

SLIDE RAIL ASSEMBLY AND SLIDING AUXILIARY DEVICE THEREOF

BACKGROUND OF THE INVENTION

1. Field of the Invention

The present invention relates to a slide rail assembly, and more particularly, to a slide rail assembly arranged with a sliding auxiliary device, which comprises a plurality of parts mutually engaged, between rails.

2. Description of the Prior Art

In a furniture system, such as a drawer system, a drawer usually can be opened or closed relative to a cabinet through a pair of slide rail assemblies. In the prior art, an undermount drawer slide is important in product development. For example, U.S. Pat. No. 8,152,252 B2 discloses related techniques for such products. Wherein, sliding auxiliary devices (300, 400) are arranged between rails, in order to facilitate the rail to move relative to another rail. The case is provided for reference.

However, the sliding auxiliary devices with different lengths are required to cooperate with the slide rail assemblies with different lengths. A sliding auxiliary device capable of being adjusted according to the length of the slide rail assembly should meet requirements of related fields. Therefore, the present invention is provided according to the above requirements.

SUMMARY OF THE INVENTION

The present invention relates to a slide rail assembly arranged with a sliding auxiliary device between rails, and the sliding auxiliary device comprising a plurality of parts mutually engaged.

According to an embodiment of the present invention, a slide rail assembly comprises a first rail, a second rail and a first sliding auxiliary device. The second rail is longitudinally movable relative to the first rail. The first sliding auxiliary device is movably arranged between the first rail and the second rail. The first sliding auxiliary device comprises a first part and a second part mutually engaged. At least one first rolling member is mounted to one of the first part and the second part for facilitating the second rail to move relative to the first rail.

According to the above embodiment, the first part and the second part of the first sliding auxiliary device respectively comprise a hook part and a recessed part corresponding to each other and mutually engaged.

According to the above embodiment, the slide rail assembly further comprises a second sliding auxiliary device movably mounted to the second rail. A first meshing feature is arranged on the first part and the second part of the first sliding auxiliary device, and a second meshing feature is arranged on the second sliding auxiliary device. The slide rail assembly further comprises a synchronizing member meshed between the first meshing feature and the second meshing feature. The synchronizing member is mounted to the second rail by a pivotal base. The slide rail assembly further comprises a third rail movably connected to the second rail. The second sliding auxiliary device comprises at least one second rolling member configured to facilitate the third rail to move relative to the second rail.

According to the above embodiment, the slide rail assembly further comprises a support member configured to support the first sliding auxiliary device.

According to another embodiment of the present invention, a sliding auxiliary device comprises a first part and a second part. The second part is detachably engaged with the first part. At least one rolling member is mounted to one of the first part and the second part for facilitating a rail to move relative to another rail.

According to the above embodiment, the first part and the second part respectively comprise a hook part and a recessed part corresponding to and detachably engaged with each other.

According to the above embodiment, the first part and the second part are mutually engaged at ends.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is an exploded view of the two sliding auxiliary devices of FIG. 3

FIG. 5 is a diagram showing a plurality of parts of the sliding auxiliary device of the slide rail assembly mutually engaged according to an embodiment of the present invention.

FIG. 8 is a diagram showing the synchronizing member of the slide rail assembly meshed between the two sliding auxiliary devices according to an embodiment of the present invention.

FIG. 9 is a diagram showing the slide rail assembly according to an embodiment of the present invention.

FIG. 10 is a diagram illustrating movement of the slide rail assembly of FIG. 9, for showing the two sliding auxiliary devices synchronously moving relative to each other through the synchronizing member.

DETAILED DESCRIPTION

Figure 1:
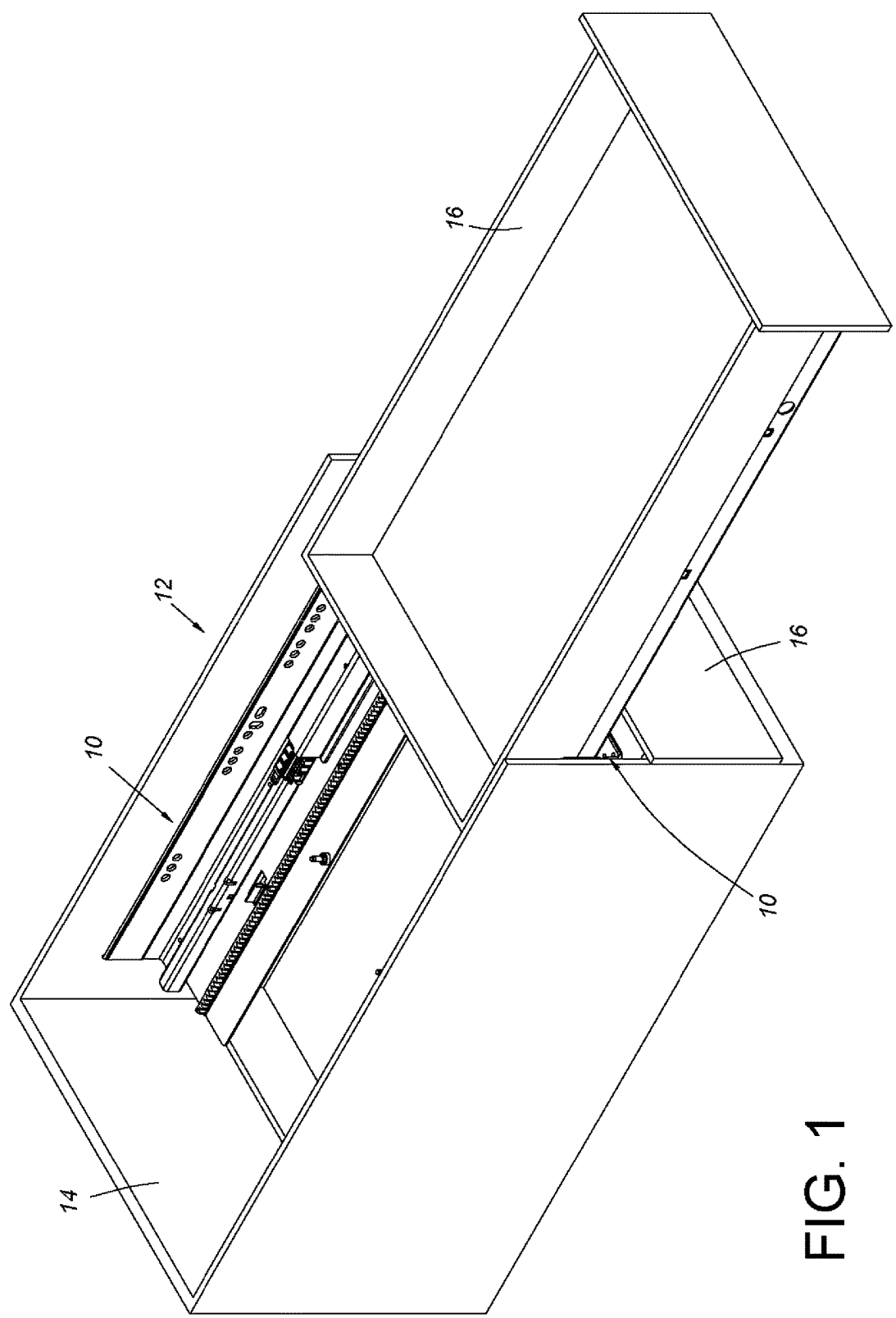
FIG. 1 is a diagram showing slide rail assemblies applied to a system according to an embodiment of the present invention.

FIG. 1 shows a pair of slide rail assemblies 10 applied to a system 12 according to an embodiment of the present invention. The system 12 can be furniture or a cabinet. In the present embodiment, the system comprises a first furniture part 14 and at least one second furniture part 16. The at least one second furniture part 16 are two drawers for example. The pair of the slide rail assemblies 10 is mounted between the first furniture part 14 and the second furniture part 16. In the present embodiment, the slide rail assemblies 10 are undermount drawer slides, and are respectively mounted to the second furniture part 16 to be adjacent to two sides of a bottom of the second furniture part 16. According to the above arrangement, the second furniture part 16 can be easily opened or closed relative to the first furniture part 14 through the pair of slide rail assemblies 10.

Figure 2:
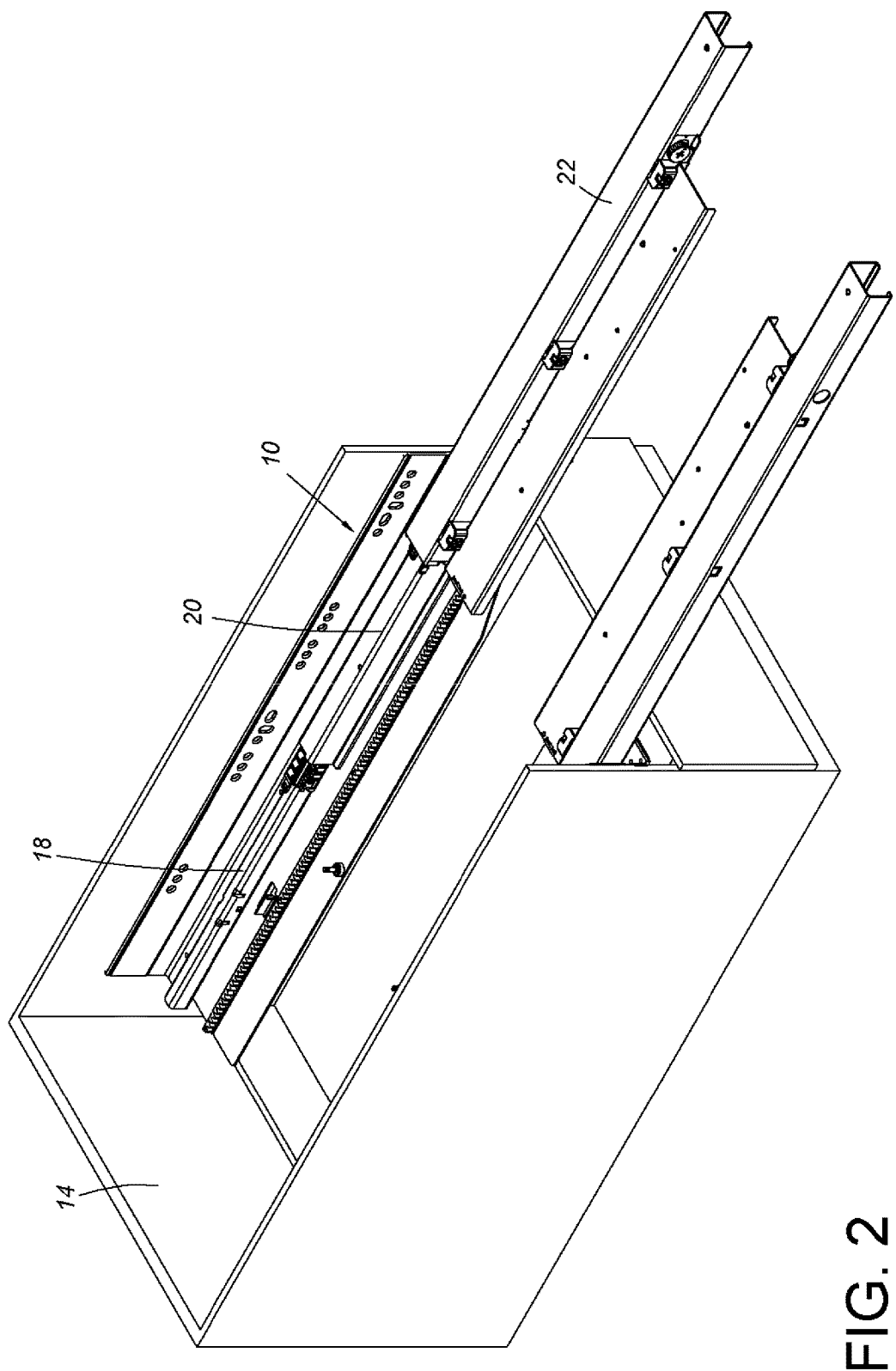
FIG. 2 is a diagram showing the slide rail assemblies comprising a plurality of rails according to an embodiment of the present invention.

As shown in FIG. 2, the slide rail assembly 10 comprises a first rail 18 and a second rail 20. Preferably, the slide rail assembly 10 further comprises a third rail 22 movably connected to the second rail 20. The first rail 18 is longitudinally and fixedly mounted to the first furniture part 14. The second rail 20 and the third rail 22 are longitudinally movable relative to the first rail 18. The second rail 20 is movably mounted between the first rail 18 and the third rail 22. The second rail 20 is configured to extend a traveling distance of the third rail 22 relative to the first rail 18.

Figure 3:
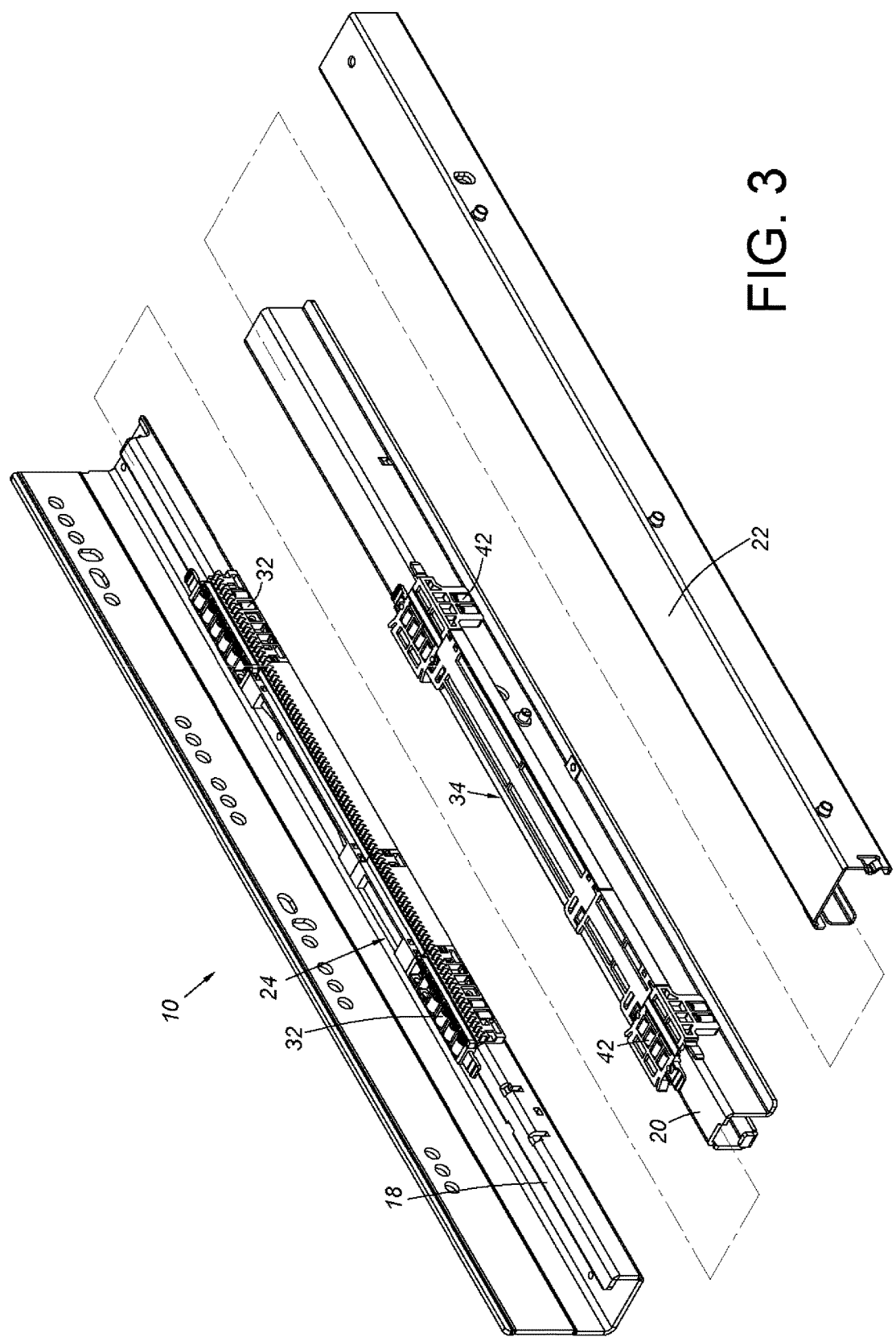
FIG. 3 is an exploded view of the slide rail assembly according to an embodiment of the present invention, wherein sliding auxiliary devices are arranged between two adjacent rails of the slide rail assembly.

As shown in FIG. 3 and FIG. 4, a first sliding auxiliary device 24 is movably arranged between the first rail 18 and the second rail 20. The first sliding auxiliary device 24 comprises at least two parts mutually engaged. In the present embodiment, the first sliding auxiliary device 24 comprises a first part 26, a second part 28 and a third part 30 detachably connected to each other in an end to end manner. At least one first rolling member 32 is mounted to one of the first part 26, the second part 28 and the third part 30. The least one first rolling member 32 is configured to facilitate the second rail 20 to move relative to the first rail 18. Briefly, the least one first rolling member 32 is capable of increasing smoothness of movement of the second rail 20 relative to the first rail 18.

On the other hand, a second sliding auxiliary device 34 can be further provided to be movably arranged between the second rail 20 and the third rail 22. Specifically, the second sliding auxiliary device 34 is movably mounted to the second rail 20. The second sliding auxiliary device 34 comprises at least two parts mutually engaged. In the present embodiment, the second sliding auxiliary device 34 comprises a first part 36, a second part 38 and a third part 40 detachably connected to each other in an end to end manner. At least one second rolling member 42 is mounted to one of the first part 36, the second part 38 and the third part 40. The least one second rolling member 42 is configured to facilitate the third rail 22 to move relative to the second rail 20. Briefly, the least one second rolling member 42 is capable of increasing smoothness of movement of the third rail 22 relative to the second rail 20. According to the above arrangement, since the first sliding auxiliary device 24 and the second sliding auxiliary device 34 are formed by mutually engaging a plurality of parts, the user can adjust lengths of the sliding auxiliary devices by engaging a specific number of parts to correspond to a real length of the slide rail assembly.

As shown in FIG. 4, the first part 26, the second part 28 and the third part 30 of the first sliding auxiliary device 24 have corresponding first hook parts 44 and first recessed parts 46 to be detachably engaged with each other. On the other hand, the first part 36, the second part 38 and the third part 40 of the second sliding auxiliary device 34 have corresponding second hook parts 48 and second recessed parts 50 to be detachably engaged with each other.

As shown in FIG. 5, the first part 26 and the second part 28 of the first sliding auxiliary device 24 can be mutually engaged and connected through engagement features of the corresponding first hook part 44 and first recessed part 46.

Figure 7:
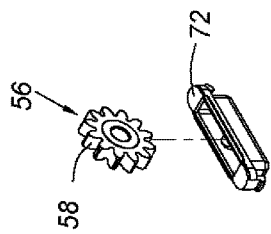
FIG. 7 is a diagram showing the synchronizing member of FIG. 6 movably mounted to a pivotal base.
Figure 6:
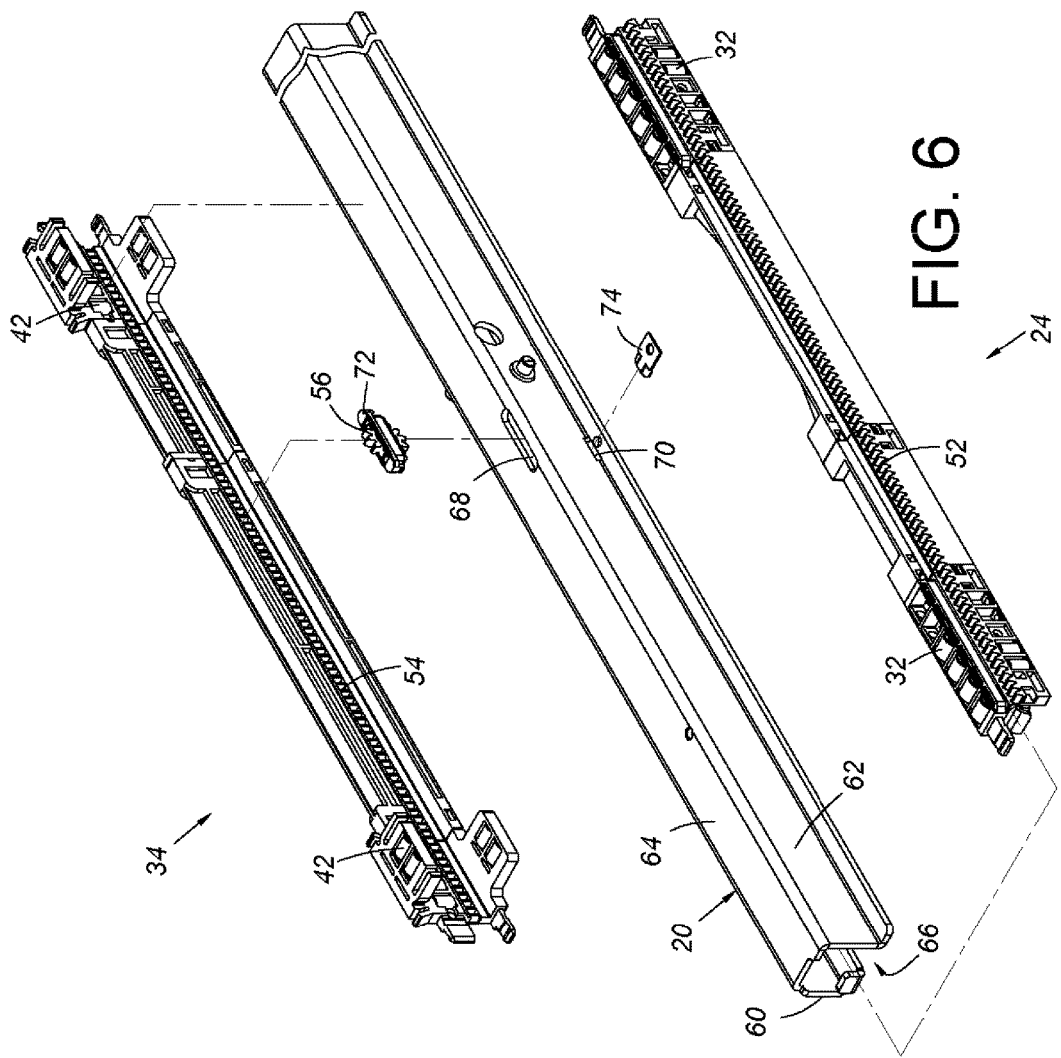
FIG. 6 is a diagram showing the sliding auxiliary devices of the slide rail assembly further comprising meshing features to mesh with a synchronizing member.

As shown in FIG. 6 and FIG. 7, the first sliding auxiliary device 24 further comprises a first meshing feature 52 adjacent to the at least one first rolling member 32, and the second sliding auxiliary device 34 further comprises a second meshing feature 54 adjacent to the at least one second rolling member 42. The slide rail assembly 10 further comprises a synchronizing member 56 mounted to the second rail 20. The synchronizing member 56 comprises a third meshing feature 58 configured to mesh between the first meshing feature 52 and the second meshing feature 54.

The first meshing feature 52 and the second meshing feature 54 can be gear racks. The third meshing feature 58 can be a gear. Specifically, the second rail 20 comprises a first side wall 60, a second side wall 62 and a longitudinal wall 64 connected between the first side wall 60 and the second side wall 62. The first side wall 60, the second side wall 62 and the longitudinal wall 64 together define a rail space 66 for accommodating the first sliding auxiliary device 24 and the first rail 18 (not shown in FIG. 6 and FIG. 7). Preferably, the second rail 20 has a first mounting hole 68 and a second mounting hole 70 communicated with the rail space 66. The synchronizing member 56 is mounted into the first mounting hole 68 of the second rail 20 by a pivotal base 72. In the present embodiment, the slide rail assembly 10 further comprises a support member 74 mounted into the second mounting hole 70 of the second rail 20 and extended into the rail space 66.

As shown in FIG. 8, through the synchronizing member 56 meshing between the first meshing feature 52 of the first sliding auxiliary device 24 and the second meshing feature 54 of the second sliding auxiliary device 34, the first sliding auxiliary device 24 and the second sliding auxiliary device 34 of the slide rail assembly 10 can synchronously move relative to each other. On the other hand, the support member 74 is configured to support a bottom of the adjacent first sliding auxiliary device 24, so as to prevent the first sliding auxiliary device 24 from being deformed by an external weight (such as a weight of a carried object on the slide rail assembly 10), such that the synchronizing member 56 can stably mesh between the first meshing feature 52 and the second meshing feature 54.

As shown in FIG. 9 and FIG. 10, through the synchronizing member 56 meshing between the first sliding auxiliary device 24 and the second sliding auxiliary device 34, the first sliding auxiliary device 24 and the second sliding auxiliary device 34 of the slide rail assembly 10 can synchronously move relative to each other, in order to improve stability of the slide rail assembly 10 when the second rail 20 and the third rail 22 are moved relative to the first rail 18.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A slide rail assembly, comprising:
a first rail;
a second rail longitudinally movable relative to the first rail, the second rail being arranged above the first rail, the second rail comprising a first side wall, a second side wall and a longitudinal wall connected between the first side wall and the second side wall, a mounting hole being formed on the second side wall;
a first sliding auxiliary device movably arranged between the first rail and the second rail, the first sliding auxiliary device comprising a first part and a second part non-movably engaged with each other, at least one first rolling member being mounted to one of the first part and the second part for facilitating the second rail to move relative to the first rail; and
a support member mounted into the mounting hole on the second side wall of the second rail and upwardly supporting a bottom of the first sliding auxiliary device.
2. The slide rail assembly of claim 1, wherein the first part and the second part of the first sliding auxiliary device respectively comprise a hook part and a recessed part corresponding to each other and mutually engaged.

3. The slide rail assembly of claim 1, further comprising a second sliding auxiliary device movably mounted to the second rail, wherein a first meshing feature is arranged on the first part and the second part of the first sliding auxiliary device, a second meshing feature is arranged on the second sliding auxiliary device, the slide rail assembly further comprises a synchronizing member meshed between the first meshing feature and the second meshing feature, the first meshing feature is above the bottom of the first sliding auxiliary device, and the synchronizing member is mounted to the second rail by a pivotal base.

4. The slide rail assembly of claim 3, further comprising a third rail movably connected to the second rail, wherein the second sliding auxiliary device comprises at least one second rolling member configured to facilitate the third rail to move relative to the second rail.

5. The slide rail assembly of claim 1, wherein the support member is longitudinally non-movable relative to the second rail.

6. A slide rail assembly, comprising:

a first rail;

a second rail longitudinally movable relative to the first rail, the second rail being arranged above the first rail;

a first sliding auxiliary device movably arranged between the first rail and the second rail, the first sliding auxiliary device comprising a first part and a second part non-movably engaged with each other, at least one first rolling member being mounted to one of the first part and the second part for facilitating the second rail to move relative to the first rail; and a support member mounted on the second rail and upwardly supporting a bottom of the first sliding auxiliary device, the support member being longitudinally non-movable relative to the second rail, wherein the support member is mounted on the second rail in a detachable manner along a direction perpendicular to a longitudinal direction of the second rail.

\* \* \* \* \*